March 20, 1951 R. F. FOSTER 2,546,028

FOCUS COIL ARRANGEMENT

Filed Nov. 19, 1948

Inventor:
Raymond F. Foster,
by Merton D. Moore
His Attorney.

Patented Mar. 20, 1951 2,546,028

UNITED STATES PATENT OFFICE 2,546,028

FOCUS COIL ARRANGEMENT

Raymond F. Foster, Stratford, Conn., assignor to General Electric Company, a corporation of New York Application November 19, 1948, Serial No. 61,057

10 Claims. (Cl. 178—5.8)

Figure 1:
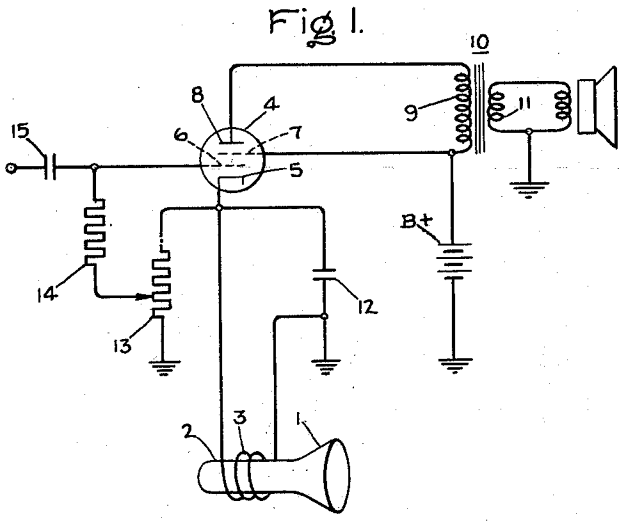

My invention relates to magnetic focusing coils such as are used in television receivers to focus the electron beam of the cathode ray tube of such receivers. It is a primary object of my invention to provide a simplified and improved current supply for magnetic focusing coils which is particularly adapted for use in television receivers.

In receivers for television signals, it is customary to use a cathode ray tube in which the electron beam is modulated in accordance with a received picture signal. Means are employed for focusing the beam upon the fluorescent end wall of the tube. Such focusing means are usually either of the electrostatic or the electromagnetic type. One of the problems in the latter type of focusing system is to provide a satisfactory arrangement for varying the focus current to accommodate various operating conditions of the receiver. While it is conventional to use a high wattage variable resistor which is placed in series or in parallel with the magnetic focusing coil to change the magnitude of the current flowing therethrough, considerable power is dissipated in this series or shunting variable resistor, thus necessitating a variable resistor which is of large physical size, so that it can dissipate the required power, and which is a considerable cost item in a competitively marketed receiver. While it is also possible to provide a separate electron discharge device in which the control electrode controls the flow of current through the focus coil, which would eliminate the necessity of a large high wattage variable resistor, this too, from a practical standpoint, is out of the question in receivers in the highly competitive low priced field, for the reason that the cost of the additional electron discharge device would be disproportionately large as compared to the advantages derived therefrom.

Also in many focus coil arrangements additional difficulties arise due to variations in the power supply of the receiver which cause corresponding variations in focus coil current and consequent defocusing of the electron beam. These power supply variations may be due to variations in line voltage or to changes in the current drain of other portions of the receiver. It would, therefore, be very desirable to provide a focus coil current supply which is relatively free from line voltage variations and changing current conditions in the receiver.

It is an object of my invention to provide a new and improved variable current supply for the electromagnetic focusing coil of television receiver cathode ray tubes.

It is another object of my invention to provide a new and improved current supply for magnetic focusing coils in which the current supply may be varied by a relatively low wattage resistor.

It is a further object of my invention to provide a new and improved focus coil current supply for a television receiver cathode ray tube which utilizes an existing electron discharge device in the receiver for the dual purpose of providing a variable focus current supply and for amplifying an auxiliary signal.

It is a still further object of my invention to provide a new and improved focus coil arrangement for television receivers in which a substantially constant focus coil current is maintained despite power supply variations of the receiver.

The novel features which I believe to be characteristic of my invention are set forth with particularity in the appended claims. My invention itself, both as to its organization and method of operation, together with further objects and advantages thereof, may best be understood by reference to the following description taken in connection with the accompanying drawing in which Fig. 1 is a schematic diagram of a focus coil arrangement incorporating the principles of my invention; and Fig. 2 is a schematic diagram of a focus coil arrangement embodying the principles of my invention in modified form.

Figure 2:
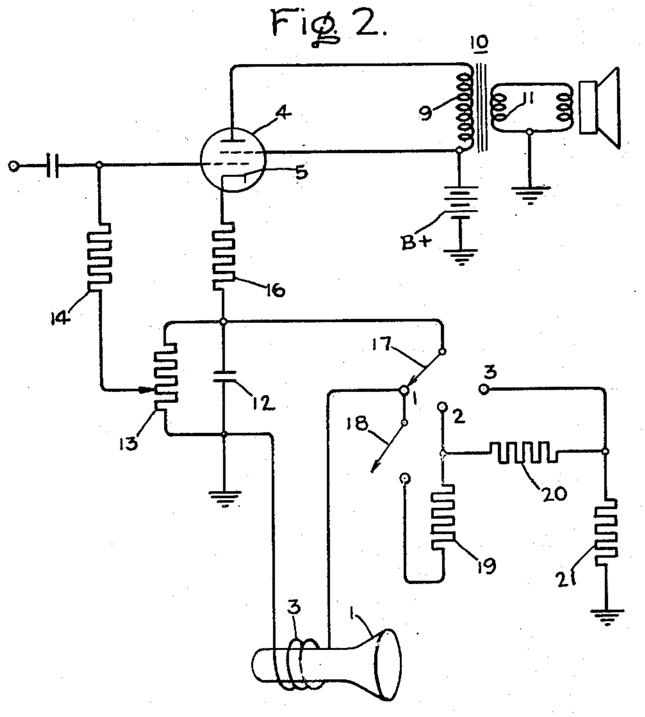

Referring to Fig. 1 of the drawing, I have shown a cathode ray tube 1 having a neck portion 2 about which is provided a magnetic focusing coil 3. Coil 3 is connected in the cathode circuit of a tetrode type electron discharge device 4, this device having a cathode 5, control electrode 6, screen electrode 7 and anode 8. Device 4 may be the power output stage of the audio channel of the television receiver. The anode 8 of device 4 is connected through the primary 9 of an output transformer 10 to a unidirectional source of supply indicated by the legend B+. The secondary 11 of output transformer 10 is connected to the voice coil of a suitable loudspeaker. The screen electrode 7 of device 4 is also connected to the unidirectional source of potential. Shunting the focus coil 3 is a by-pass capacitor 12, this capacitor having a sufficiently low impedance to filter out any alternating current voltage which may appear across focus coil 3. Also shunting the focus coil is a potentiometer 13, the control electrode 6 being connected to the variable arm of this potentiometer through resistor 14. Potentiometer 13 is of relatively high resistance so that only a small portion of the cathode current will flow therethrough. Input signals may be coupled to device 4 through a conventional blocking capacitor 15.

Considering now the operation of this circuit under static conditions, it will be seen that the cathode current of device 4, which is a unidirectional current, flows through the focusing coil 3. The cathode current of device 4 will have a certain magnitude depending upon the supply and biasing potentials of device 4, and if coil 3 is provided with a suitable number of turns, the cathode current of device 4 flowing through these turns will focus the electron beam upon the end wall of cathode ray tube 1 in a well known manner. The magnitude of the cathode current of device 4 may be varied by changing the position of the variable arm of potentiometer 13, which will change the control electrode bias potential of device 4 and consequently the value of cathode current thereof. It is to be noted that potentiometer 13 accomplishes the same variation in focus coil current as a high wattage resistor which is in series or parallel relation to the focus coil, although potentiometer 13 is of conventional size and is relatively inexpensive.

If we now consider the operation of the circuit when a signal voltage is applied through capacitor 15 to the control electrode of device 4, it will be seen that the connection of the focus coil in the cathode circuit of device 4 does not cause degeneration of the input signal because of the shunting effect of capacitor 12 which is placed across the focus coil. For alternating current signals, therefore, the focus coil acts merely as a cathode bias resistor and amplified signal voltage may be derived from anode 8 through output transformer 10 in substantially the same manner as the conventional audio output amplifier. It is to be noted that the use of the focus coil in the cathode circuit of device 4 eliminates another high wattage resistor, namely, the cathode bias resistor required in the conventional audio output amplifier. The shunting capacitor 12 also by-passes the potentiometer 13 so that variations in focus coil current, by adjustment of the potentiometer 13, may be made independently of the operation of device 4 as an amplifier.

It is an important feature of my invention that a substantially constant current supply is provided for the focusing coil. This will be readily apparent when it is realized that changes in focus coil current are opposed by corresponding changes in the control electrode potential of device 4 due to the degenerative connection of the focus coil for direct currents. Thus, if the B+ potential increases due to a surge in line voltage, or a change in the operating conditions of the receiver, the current through the focus coil would tend to increase. This increased current would, however, result in an increased bias voltage across potentiometer 12 and therefore the control electrodes bias would be increased so that the unidirectional component of cathode current would remain substantially constant despite the variation in power supply potential.

The modified form of my invention represented in Fig. 2 differs from that of Fig. 1 only in certain particulars. The corresponding elements have been designated by the same reference numerals and the function of these elements is essentially the same, therefore, they need not be repeated here. In this modification a resistor 16 is inserted between the cathode 5 of electron discharge device 4 and the focus coil circuit. Resistor 16 is of relatively small value and provides a small amount of degeneration for the input circuit of device 4. To provide for different ranges of focus coil current, which may be necessary to provide adequate focusing range for all cathode ray tubes, a switch 17 is utilized, this switch being operable to one of three positions. With switch 17 in position 1 the focus coil 3 is connected into the cathode circuit of device 4 in a manner similar to that shown in Fig. 1. When switch 17 is operated to position 2 an auxiliary shorting switch 18, which may be ganged to the shaft of switch 17, is closed, thus placing a resistor 19 in series with the focus coil 3. Also, in position 2 resistors 20 and 21 are placed in parallel with the series combination of resistor 19 and the focus coil 3. When switch 17 is operated to position 3 the focus coil is placed in series with resistors 19 and 20, this series combination being paralleled by resistor 21. Auxiliary shorting switch 18 remains closed when switch 17 is operated to position 3.

Considering now the operation of the focus coil arrangement shown in Fig. 2, switch 17 and the cathode bias network associated therewith provide various current ranges of focus coil current without substantially affecting the operation of device 4 as an amplifier. In position 1 the highest range of focus coil current is available; for example, this range may be from 35 to 55 milliamperes when a 25L6 type electron discharge device is utilized as device 4. When switch 17 is operated to position 2 the value of resistor 19 and the parallel combination of resistors 20 and 21 is so chosen that the total resistance seen from the cathode remains the same as it was in position 1. However, the current through focus coil 3 is considerably reduced and may be in the range of 20 to 35 milliamperes for the conditions stated above. In position 3 the values of resistor 21 and series resistors 19 and 20 are so chosen that the resistance seen from the cathode of device 4 is still substantially the same as that presented in position 1. However, the focus coil current is additionally reduced due to the series resistance of resistors 19 and 20 and may have a range from 12 to 20 milliamperes under the conditions stated above. It will be understood that means are provided for varying the focus coil current throughout any particular selected one of the above-mentioned current ranges comprising potentiometer 13 which is located on the front panel of the receiver. Switch 17 may be placed on the rear panel of the receiver inasmuch as it is only necessary to change the position of switch 17 to accommodate changes in the current demands of device 4. With such an arrangement the undistorted power output of device 4 may be maintained at useable levels and greater variations in the current required by focus coil 3 and the current supplied by device 4 may be accommodated.

While I have indicated the focus coil as being connected in the cathode circuit of the audio amplifier of a television receiver, it will be readily apparent that other amplifiers of the receiver may be utilized for this dual function, it being only necessary that the current of the electron discharge device is of sufficiently large value suitably to focus the electron beam of the cathode ray tube.

While I have shown and described particular embodiments of my invention, it will of course be understood that I do not wish to be limited thereto since various changes and modifications may be made without distinguishing from my invention and I contemplate in the appended claims to cover all such changes and modifications as fall within the true spirit and scope of my invention.

What I claim as new and desire to secure by Letters Patent of the United States is:

1. A combined amplifying and cathode ray tube focusing system comprising a magnetic focusing coil for a cathode ray tube, an electron discharge amplifier having at least an anode, a cathode and a control electrode, means for impressing signal voltages to be amplified between said control electrode and cathode, a signal output circuit connected between said anode and cathode, means for energizing said focus coil with unidirectional current flowing in the common cathode circuit of said device, means for impressing a bias voltage on said control electrode to provide a desired magnitude of said current, and means for adjusting said bias voltage to adjust said current.

2. In a television receiver, a combined amplifying and cathode ray tube focusing arrangement comprising, an electron discharge device having at least an anode, a cathode and a control electrode, a magnetic focusing coil for a cathode ray tube, means connecting said focusing coil in the cathode circuit of said device so as to be energized by flow of cathode current in said device, an impedance element connected across said focusing coil, means for applying a signal voltage to be amplified to the control electrode of said device, said impedance element having a relatively low impedance for said signal voltage, and means for deriving from the anode of said device said signal voltage in amplified form.

3. In a television receiver, a combined amplifying and cathode ray tube focusing arrangement comprising, an electron discharge device having at least an anode, a cathode and a control electrode, a magnetic focusing coil for a cathode ray tube, means connecting said focusing coil in the cathode circuit of said device so as to be energized by flow of cathode current in said device, an impedance element connected across said focusing coil, means to vary the control electrode bias of said device to cause corresponding variations in the flow of cathode current through said coil, means for applying a signal voltage to be amplified to the control electrode of said device, said impedance element having a relatively low impedance for said signal voltage, and means for deriving from the anode of said device said signal voltage in amplified form.

4. In a television receiver, a combined amplifying and cathode ray tube focusing arrangement comprising, an electron discharge device having at least an anode, a cathode and a control electrode, a magnetic focusing coil for a cathode ray tube, means connecting said focusing coil in the cathode circuit of said device, said focusing coil having resistance and inductance sufficient to provide focusing of the cathode ray tube with a current equal to the static cathode current of said device, a capacitive impedance element connected across said focusing coil, means to vary the control electrode bias of said device to cause corresponding variations in the flow of current through said coil, means for applying an alternating signal voltage to be amplified to the control electrode of said device, said impedance element having a relatively low impedance for said signal voltage, and means for deriving from the anode of said device said signal voltage in amplified form.

5. In a television receiver, a combined amplifying and cathode ray tube focusing arrangement comprising, an electron discharge device having at least an anode, a cathode and a control electrode, a magnetic focusing coil, means connecting said focusing coil in the cathode circuit of said device, low impedance shunting means connected across said focusing coil, means for varying the flow of current through said coil comprising a relatively high resistance potentiometer connected across said coil, means for connecting the control electrode of said device to a tap on said potentiometer, means for applying a voltage to be amplified to the control electrode of said device, and means for deriving from the anode of said device said voltage in amplified form.

6. In a television receiver, a combined amplifying and cathode ray tube focusing arrangement comprising, an electron discharge device having at least an anode, a cathode and a control electrode, a magnetic focusing coil, means connecting said focusing coil in the cathode circuit of said device, said focusing coil having resistance and inductance sufficient to provide focusing of the cathode ray tube with a current equal to the static cathode current of said device, low impedance shunting means connected across said focusing coil, means for varying the flow of current through said coil comprising a relatively high resistance potentiometer connected across said coil, means for connecting the control electrode of said device across at least a portion of said potentiometer, means for applying a voltage to be amplified to the control electrode of said device, and means for deriving from the anode of said device said voltage in amplified form.

7. A cathode ray tube focusing arrangement comprising, a magnetic focusing coil, an electron discharge device having at least an anode, a cathode and a control electrode, means connecting said focus coil between said cathode and ground, a relatively high resistance potentiometer connected across said coil, means connecting said control electrode to a variable tap on said potentiometer whereby the current through said coil may be varied in accordance with the position of said tap.

8. A cathode ray tube focusing arrangement comprising, a magnetic focusing coil, an electron discharge device having at least an anode, a cathode and a control electrode, means connecting said focus-coil between said cathode and ground, means connecting said anode to a unidirectional source of potential, a relatively high resistance potentiometer connected across said coil, means connecting said control electrode to a variable arm of said potentiometer whereby the current through said coil may be varied in accordance with the position of said variable arm.

9. A combined amplifying and cathode ray tube focusing arrangement comprising, a magnetic focusing coil for a cathode ray tube, an electron discharge amplifying device having at least an anode, a cathode and a control electrode, means connecting said focus coil in circuit between said cathode and ground so as to be energized by flow of cathode current in said device, means for impressing signal voltages to be amplified between said control electrode and ground, a signal output circuit, means connecting said anode to ground through said signal output circuit, means energizing said anode from a unidirectional source of operating potential, and means for varying the flow of cathode current through said coil in response to variations in the control electrode bias of said device.

10. In a television receiver, a combined amplifying and cathode ray tube focusing arrangement comprising, an electron discharge device having at least an anode, a cathode and a control electrode, a magnetic focusing coil, a cathode bias network comprising a plurality of current paths, switch means for selectably connecting said focusing coil in different ones of said current paths whereby different ranges of focusing coil current may be selected without substantial change in the resistance of said cathode bias network, low impedance shunting means connected across said cathode bias network, means for varying the focusing coil current throughout a particular selected one of said focusing coil current ranges comprising a relatively high resistance potentiometer connected across said low impedance shunting means, means connecting the control electrode of said device to an arm of said potentiometer, means for applying a voltage to be amplified to the control electrode of said device, and means for deriving from the anode of said device said voltage in amplified form.

RAYMOND F. FOSTER.

REFERENCES CITED

The following references are of record in the file of this patent:

UNITED STATES PATENTS

| Number | Name | Date |
|---|---|---|
| 2,430,331 | Gallella | Nov. 4, 1947 |
| 2,458,891 | Boyle | Jan. 11, 1949 |

OTHER REFERENCES

RCA Victor Television Receiver, Model 630TS, Service Data, 1946, No. T1, published by RCA, RCA Victor Div., Camden, N. J., p. 43.